Sept. 3, 1968

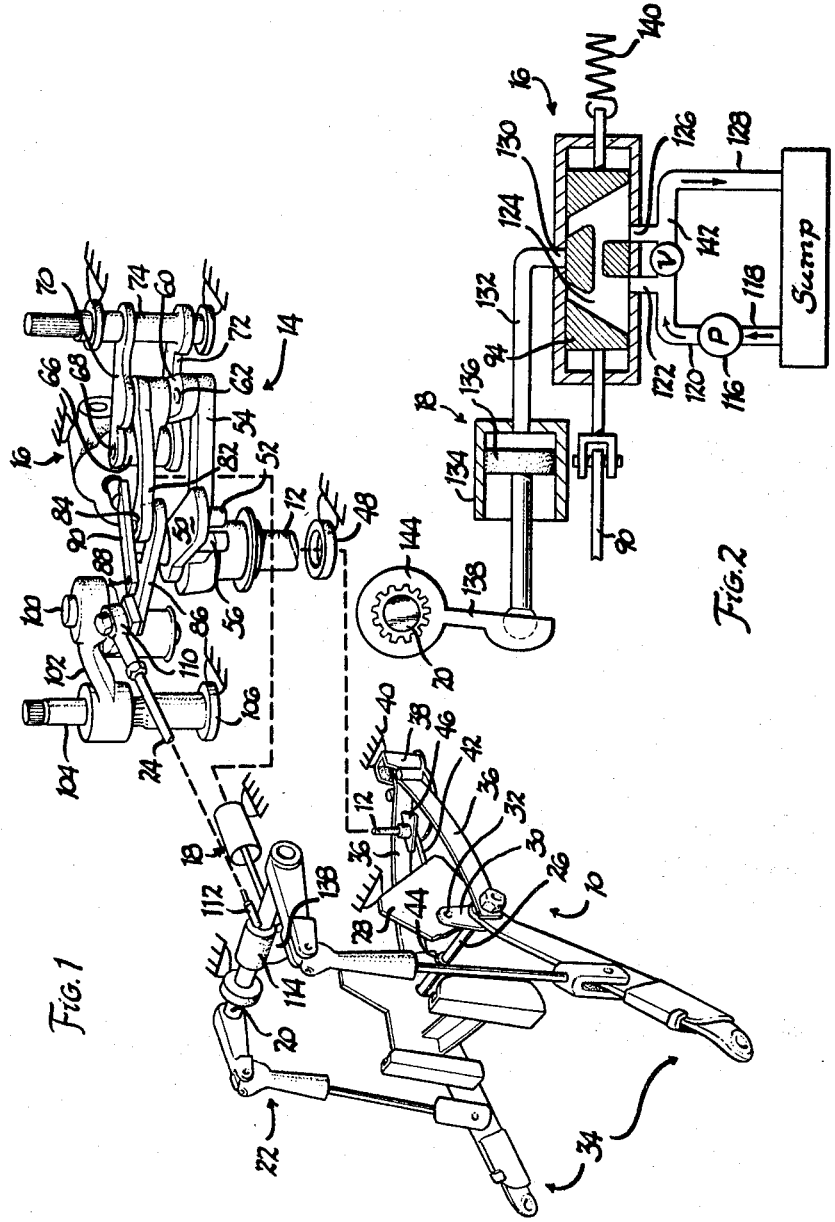

M. R. NORTH 3,399,733

LOAD-DEPTH CONTROL LINKAGE

Filed July 26, 1965

Inventor.
MAX R. NORTH
By
WILSON, SETTLE, BATCHELDER &
ATT'YS. CRAIG

Sept. 3, 1968   M. R. NORTH   3,399,733
LOAD-DEPTH CONTROL LINKAGE
Filed July 26, 1965   3 Sheets-Sheet 3

Inventor.
Max R. North
By
Wilson, Settle, Batchelder
Att'ys.   & Craig

United States Patent Office 3,399,733
Patented Sept. 3, 1968

3,399,733
LOAD-DEPTH CONTROL LINKAGE
Max R. North, Racine, Wis., assignor to J. I. Case Company, Racine, Wis., a corporation of Wisconsin
Filed July 26, 1965, Ser. No. 474,927
8 Claims. (Cl. 172—9)

ABSTRACT OF THE DISCLOSURE

A tractor hydraulic lift cylinder valve control linkage automatically and selectively operated either in response to the position of the draft links of the tractor or in response to the draft force imposed on the links or to mixed conditions of draft and position of the links. The selection of the conditions desired to be sensed are made manually and consists in rearranging certain of the links of the control linkage.

---

This invention relates to improvements in combined automatic draft and position control systems for tractor drawn implements such as plows or cultivators.

As employed in the following specification, the terms "draft control" and "position control" respectively refer to operation of a tractor drawn implement where the control system either maintains the draft on the implement constant (draft control) by varying the depth of the implement or maintains the working depth constant (position control) regardless of any variations in draft applied to the implement. Under certain conditions, one of these two types of controls may have advantages over the other or vice versa and thus in recent years several control systems have become available which enable the tractor operator to operate the implement selectively in either a draft control or position control condition. One example of such a system is that disclosed in United States Letters Patent No. 2,721,508.

It is one object of the present invention to provide a combined draft and position control system for a tractor drawn implement in which the response of the system to variations in draft can be adjusted throughout a continuous range extending from a zero response to a selected maximum response.

It is another object of the present invention to provide a combined draft and position control system for a tractor drawn implement in which hunting or oscillation of the implement in depth during automatic draft control is minimized or substantially eliminated.

It is another object of the invention to provide a draft and position control system for a tractor drawn implement in which backlash and lost motion within the system is minimized.

The foregoing, and other objects are achieved in a control system in which a hydraulic motor is employed in a conventional manner to raise or lower the tractor drawn implement. Operation of the motor is controlled by a valve having a reciprocable spool movable in opposite directions from a neutral or holding position to respectively actuate the motor in raising or lowering movement. The valve spool is positioned by a floating control link which is pivotally coupled intermediate its ends to the valve spool so that the position of the spool is determined by the combined position of the two opposite ends of the control link. One end of the control link is connected to a draft responsive linkage, while the opposite end of the control link is connected to a linkage responsive to the position of the implement. The draft responsive linkage includes a bell crank which is movable about a pivot in direct response to variations in draft sensed by a draft sensing mechanism. The bell crank is movable relative to the fixed frame in a fashion so that the amount of swinging movement of the bell crank transmitted to the control link can be proportionately varied at will and can be reduced if desired to substantially zero.

The linkage system is so proportioned that when a draft change signal is applied to the valve, the valve is restored to neutral in a manner tending to undercorrect or undercompensate for the given draft change. Upon the sensing of an increase in draft, the system will make a correction by which the implement is raised from its original position with the system restored to neutral at a time when the draft on the implement at its new position slightly exceeds the original draft setting. In this manner, hunting or overcorrection is avoided or minimized. A single spring is attached to the valve spool to bias the valve spool toward an implement raising position. The spring force is transmitted through the valve spool to the control link and is in turn applied to both the position responsive and draft responsive linkages because of the spring bias applied to the linkage system, a non-positive type coupling between the draft sensing mechanism and the draft responsive linkage can be employed. Other objects and features of the invention will become apparent by reference to the following specification and to the drawings.

In the drawings:

FIGURE 1 is a perspective view, with certain parts broken away or omitted, showing elements of a control system embodying the present invention;

FIGURE 2 is a schematic diagram, partially in section, of a hydraulic control circuit employed in the apparatus of FIGURE 1;

Figure 4:
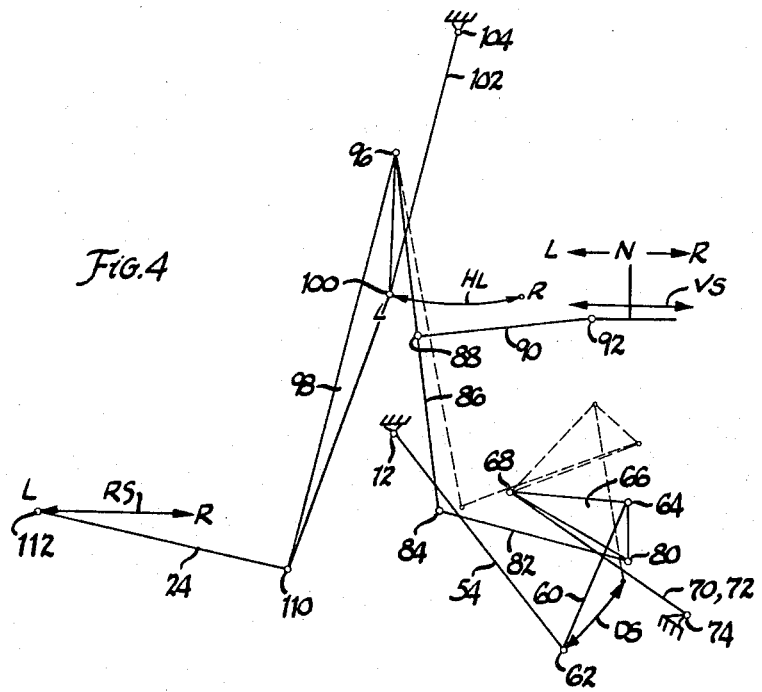
FIGURE 4 is a schematic diagram of the control linkage set for manual or position control operation.

Referring first to FIGURE 1, a system embodying the present invention includes, in general, a draft sensing mechanism designated generally 10 which transmits a signal representative of the magnitude of draft applied to a tractor drawn implement by rotating a draft signal shaft 12. The rotative position of shaft 12 is applied to a control linkage designated generally 14 which operates to position the spool of a control valve 16. Valve 16 is connected into the tractor hydraulic system to conduct fluid under pressure to or from a single acting hydraulic motor 18 which rotatively positions a rockshaft 20 to raise or lower the tractor drawn implement, not shown, through a power lift linkage designated generally 22. A follow-up shaft 24 is connected between rockshaft 20 and control linkage 14 to re-position the spool of valve 16 in accordance with the elevation of the implement.

Draft sensing mechanism 10 includes a cross-shaft 26 which is hung from a portion of the tractor frame, such as the drawbar support frame 28 by a pair of links 30 pivotally supported upon the frame as at 32. At each end, cross-shaft 26 projects outwardly beyond the links 30 and draft arms 34, to which the implement is coupled in a conventional manner, are pivotally supported at their forward ends upon cross-shaft 26. The projecting ends of cross-shaft 26 also pass outwardly through bores in the rearward ends of a pair of bowed leaf springs 36 which are joined at their forward ends as by a bracket 38 fixedly mounted upon the tractor frame as at 40. Bracket 38 and leaf springs 36 form a wishbone-like spring assembly which couples cross-shaft 26 to the tractor frame in a manner permitting forward and rearward movement of the cross-shaft in response to decreases or increases in the magnitude of draft applied to the implement and transmitted to the cross-shaft via draft arms 34.

The fore and aft position of cross shaft 26 is thus representative of the amount of draft applied to an implement attached to draft arms 34. A link 42 is mounted upon cross-shaft 26 as at 44 and is pivotally connected at its forward end to a crank 46 mounted on the lower end of draft signal shaft 12, signal shaft 12 being journalled for rotation about a stationary vertical axis in the tractor frame as schematically indicated at 48.

For the purposes of the present application, draft sensing mechanism 10 rotates signal shaft 12 in a clockwise direction (as viewed from above) in response to a decrease in draft, and rotates shaft 12 in a counterclockwise direction in response to an increase in draft.

Draft sensing mechanism 10 does not, per se, constitute the present invention and is disclosed and described in greater detail in a co-pending application of Alfred A. Wridt, Ser. No. 431,928, filed Feb. 11, 1965, and assigned to the assignee of the present application.

Figure 3:
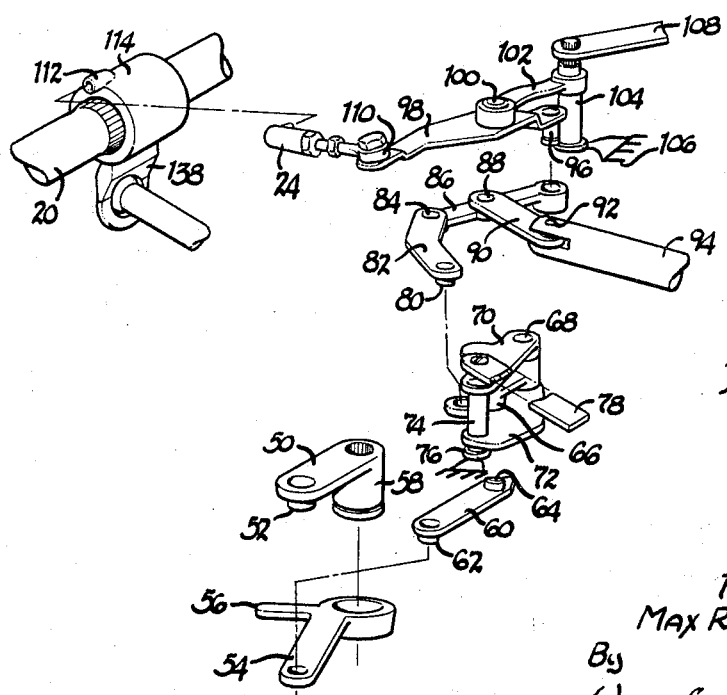
FIGURE 3 is an exploded view of certain elements of the linkage employed in the system of FIGURE 1.
Figure 5:
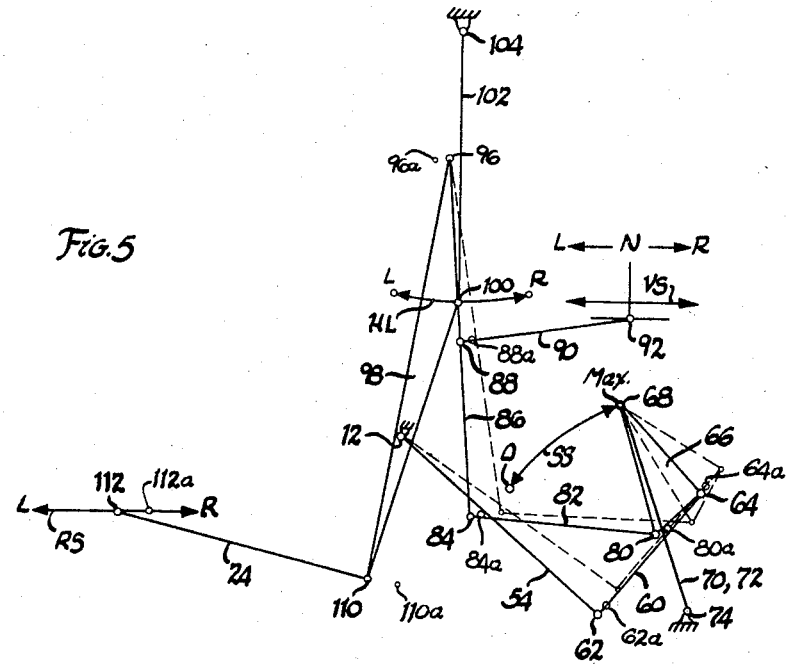
FIGURE 5 is a schematic diagram of said linkage set for automatic draft control operation showing movement of the linkage in response to a draft increase signal.
Figure 6:
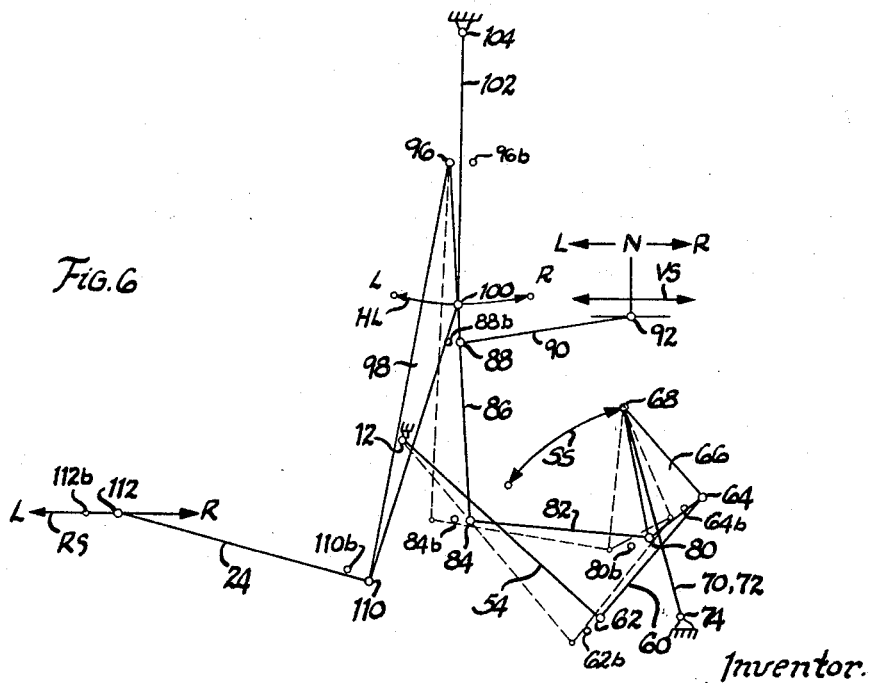
FIGURE 6 is a schematic diagram of the linkage, set for automatic draft control operation, showing movement of the linkage in response to a decrease in the draft signal.

The interrelationship of the various links of control linkage 14 may be best understood by reference to the exploded diagram of FIGURE 3 and the schematic diagrams of FIGURES 4–6. A draft signal crank 50 is fixedly secured to the upper end of signal shaft 12 for rotation with the shaft. At the outer end of crank 50, a pin 52 projects downwardly from crank 50 into the plane of movement of a draft signal link 54 having an integral projecting abutment finger 56, pin 52 of crank 50 projecting into the space between link 54 and its finger 56. Link 54 is rotatably mounted upon the hub 58 of crank 50 so that link 54 can rotate relative to the hub between end limits established by the engagement of pin 52 with either of link 54 or its projecting finger 56.

The outer end of link 54 is pivotally connected to one end of a transmitting link 60 as by a pivot pin 62 and the opposite end of link 60 is connected by a pivot pin 64 to an intermediate location on a bell crank 66. Bell crank 66 in turn is pivotally supported at one end by a pin 68 which is supported by vertically spaced parallel upper and lower support links 70 and 72. Links 70 and 72 are rigidly interconnected by pin 68 and a shaft 74 which is rotatably supported in the tractor frame as schematically indicated at 76. Links 70 and 72 are fixedly secured to and rotate in unison with shaft 74, shaft 74 being rotatable by manually operated sensitivity setting hand lever 78.

The opposite end of bell crank 66 is connected by a pivot pin 80 to one end of a transmitting link 82 whose opposite end is connected by a pivot 84 to one end of a valve control link 86.

Valve control link 86 is connected at an intermediate location by a pivot 88 to a link 90 which in turn is connected at its opposite end by a pivot 92 to the spool 94 of control valve 16. Valve control link 86 is a floating link and the position of valve spool 94 is determined jointly by the positions of the two opposite ends of control link 86 relative to the fixed frame. The linkage described thus far, including links 50, 54, and 60, bell crank 66, and link 82, positions pivot pin 84 of valve control link 86 relative to the frame in accordance with the magnitude of draft applied to the implement during automatic draft control operation.

Links 70 and 72, which position pivot 68 of bell crank 66 relative to the frame, constitute a sensitivity adjustment which functions, in a manner to be described below, to vary the amount of movement of pivot pin 84 in response to a given draft control signal variation. Depending upon the setting of the sensitivity adjustment constituted by links 70 and 72, the control system can be set to produce a maximum amount of movement of pivot pin 84 in response to a draft control signal or to hold pivot 84 in a substantially stationary position regardless of the magnitude of a draft control signal applied. By adjustment of the positions of links 70 and 72, the response of the system to a given draft variation or signal can be selected to any proportionate response over a continuous range extending from zero to a maximum response.

The opposite end of valve control link 86 is pivotally connected by a pivot pin 96 to one end of position responsive link 98. Link 98 is pivotally supported at a location intermediate its ends upon a pivot pin 100 which pivotally mounts link 98 upon one end of a position control link 102. The opposite end of position control link 102 is fixedly secured to a position control shaft 104 which is mounted for rotation about a fixed axis in the tractor frame as schematically indicated at 106. A position control hand lever 108 is non-rotatably splined to shaft 104 to manually position shaft 104, and hence position control link 102, rotatively relative to the fixed frame.

The opposite end of link 98 is pivotally connected by a ball and socket type pivot connection 110 to one end of follow-up link 24, the opposite end of follow-up link 24 being connected by a second ball and socket type pivot connection at 112 to a hub 114 non-rotatively splined to rockshaft 20.

Assuming that hand lever 108 is held stationary, link 102 and pivot 100 are likewise stationary relative to the tractor frame. Rotation of rockshaft 20 can thus be transmitted through follow-up link 24 and link 98 to pivot 96, thereby shifting the end of valve control link 86 relative to the frame to shift valve spool 94 in accordance with the position of rockshaft 20 which is representative of the depth of the implement.

A schematic diagram of the hydraulic control system is shown in FIGURE 2. The diagram of FIGURE 2 is for illustrative purposes only and is not intended as an accurate representation of the valve structure. In FIGURE 2, a conventional tractor hydraulic system includes a pump 116 having its intake 118 connected to a sump and its outlet 120 connected to a high pressure port 122 in the housing of valve 16.

When valve 16 is in a neutral, or holding position, a chamber 124 in valve spool 94 connects port 122 with an outlet port 126 in the housing of valve 16 which is connected by a conduit 128 to the sump. A control port 130 in valve 16 is blocked by spool 94 when the valve is in its holding position. Port 130 is connected by a conduit 132 to the cylinder 134 of the single acting power-lift motor 18 whose piston 136 is connected to a crank 138 fixedly mounted upon hub 114 on rockshaft 20. Thus, extension of piston 136 rotates rockshaft 20 in a clockwise direction as viewed in FIGURE 2, this direction of rotation causing the power lift linkage 22 to elevate draft arms 34. Movement of piston 136 to the right as viewed in FIGURE 2 causes a counterclockwise rotation of rockshaft 20, thereby lowering draft arms 34.

Valve spool 94 is continuously biased to the right as viewed in FIGURE 2 by a tension spring 140, movement of valve spool to the right being restrained by link 90 which is connected to the central portion of valve control link 86.

Movement of valve spool 94 to the right from the holding position shown in FIGURE 2, blocks outlet port 126 and at the same time connects the high pressure port 122 to port 130 via chamber 124. This position of valve 16 causes high pressure fluid to flow from the pump 116 through the valve into conduit 132, thereby causing piston 136 to stroke to the left in implement raising movement as viewed in FIGURE 2. Movement of valve spool 94 to the left from the FIGURE 2 position covers inlet port 122 and connects conduit 132 to the sump to dump fluid from motor 18. When port 122 is covered, the pump outlet can flow to the sump via a bypass conduit 142 having a pressure relief valve V.

In essence, movement of valve spool 98 to the right or forwardly from the holding position actuates motor 18 to raise the implement, while movement of valve spool 94 to the left or rearwardly from its neutral or holding position dumps fluid under pressure from motor 18 to permit lowering of the implement.

In actual practice, a valve somewhat more complex than that schematically indicated in FIGURE 2 is employed, one such valve being that disclosed in co-pending application Ser. No. 341,309, filed Jan. 30, 1964, and assigned to the assignee of the present application.

It will be noted that the biasing action of spring 140 is transmitted through valve spool 94 to link 90 and thus to the linkage described above.

The functioning of the linkage may be best understood by reference to FIGURES 4 through 6, which are schematic diagrams of the linkage as viewed from above.

In FIGURE 4, the linkage is shown as being set for a position control operation in which variations in the magnitude of draft applied to the implement have no effect upon the system. The range of movement of various elements in the system are illustrated by double ended arrows, the arrow RS indicating the range of movement of pivot 114 upon rotation of rockshaft 20 throughout its limit of rotation. The range of movement of pivot 100 by manual adjustment of hand lever 18 is indicated by the arc HL while the range of movement of the valve spool 94 is indicated by the double ended arrow VS. The arc DS indicates the total range of movement of pivot 62 in response to draft signals. The letters L and R indicate the lower and raised positions respectively, while the letter N indicates the position of pivot 92 when the valve spool is in its neutral or holding position. The range of movement of pivot 68 at the outer ends of sensitivity adjustment links 70, 72 has been omitted from FIGURE 4 for the sake of clarity, but is shown at SS in FIGURE 5. In FIGURE 4 levers 70 and 72 are at one end of their range of movement in the position control or zero sensitivity setting.

In FIGURE 4, pivot 112 is at extreme low end of its range of movement, thus indicating that the towed implement is at its maximum depth. Hand lever 108 has been set at its extreme lower position. In this position, valve control link 86, via link 90 has positioned the valve spool to the left of its neutral or holding position, and thereby the valve is set to supply fluid under pressure to motor 18, actively holding the implement at its lowered position.

In FIGURE 4, draft signal link 54 is shown in full line at its extreme limit of movement representing a minimum magnitude of draft signal. Assuming that the magnitude of draft should increase, link 54 would swing in a counterclockwise direction to swing pivot 62 along the arc DS. Assuming a maximum draft signal, link 60 would be shifted from the full line position of FIGURE 4 to the dotted line position, thereby driving bell crank 66 from its full line position to its dotted line position. This movement of bell crank 66 is required since sensitivity adjustment links 70 and 72 are held stationary on the zero sensitivity position, thereby holding pivot 68 stationary. Movement of bell crank 66 in a counterclockwise direction about pivot 68 carries link 82 to the broken line position of FIGURE 4, this action causing only a slight displacement of pivot 84 from its full line to its dotted line position, and this in turn causing a slight shifting movement of pivot 92.

It can be seen that the shifting movement applied to pivot 92 does not appreciably shift the valve setting, even though a maximum possible draft signal variation has been applied to the linkage. In essence, pivot 84 which represents the draft control signal input to control link 60, will remain stationary, or substantially so, whenever sensitivity adjustment links 70 and 72 are in the zero sensitivity position shown in FIGURE 4, regardless of any fluctuations of draft at the implement.

With sensitivity adjustment links 70 and 72 at their zero sensitivity position, the system is set up for manual or so-called position control operation of the implement at which the implement depth is set by manipulation of hand lever 108 and will remain constant regardless of variations in draft. To raise the implement from its extreme lower position, the hand lever is manually rotated to rotate link 102 in a counterclockwise direction about the axis of shaft 104 from the FIGURE 4 position. This action swings pivot 100 away from its lower end of movement, and thereby carries pivot 96 to the right from the position shown in FIGURE 4. Since, as described above, pivot 84 remains essentially stationary, rightward movement of pivot 96 swings valve control link 86 in a clockwise direction about pivot 84 as viewed in FIGURE 4, thereby moving pivot 92 and the valve spool to the right toward the neutral position. The valve spool will cross its neutral or holding position at approximately the point in time at which pivot 100 passes the midpoint of its range of movement. As the valve spool passes its neutral or holding position, the valve connects the cylinder of hydraulic motor 18 to the high pressure output of the tractor driven pump and fluid under pressure is transmitted to the motor 18 to raise the implement. As the implement begins to elevate, rockshaft 20 rotates and drives pivot 112 to the right from its FIGURE 4 position. This action is transmitted by follow-up link 24 to the lower end of link 98 and swings link 98 in a counterclockwise direction about pivot 100, this action tending to move pivot 96 to the left as viewed in FIGURE 4 to draw the valve spool back toward its neutral position. Elevation of the implement continues until the valve is drawn back to its neutral or holding position by the implement movement transmitted by follow-up link 24 to link 98 to link 86.

FIGURES 5 and 6 show, in schematic form, operation of the linkage when the sensitivity adjustment is set for maximum sensitivity. In both FIGURES 5 and 6, the full line position of linkage is the same, the broken line portion of FIGURE 5 showing movement of the draft responsive portion of the linkage in response to an increasing draft signal, while the broken line positions of FIGURE 6 represent a decreasing draft signal input.

Referring to FIGURE 5, the linkage is disclosed with pivot 100 at the mid-point of its range of movement indicating a neutral position of hand control lever 108. Pivot 112 likewise is located midway of its range indicating the implement to be at a location half way between its minimum and maximum depth. Draft signal link 54 is midway of its range of movement and with these conditions the linkage is illustrated with the valve spool at its neutral or holding position.

Assuming that with the linkage set as indicated, the application of an increased draft to the implement will cause a counterclockwise rotation of the draft signal shaft 12. This rotation is not directly applied to link 54, but instead, referring to FIGURE 3, is applied to rotate crank 50 in a counterclockwise direction. Pin 52 of crank 50 is normally engaged with finger 56 of link 54, this engagement being induced by the action of spring 140 on the valve spool. The reaction of spring 140 is applied in FIGURE 5 to draw pivot 92 to the right as viewed in FIGURE 5, thereby urging valve control link 86 to the right which in turn forces transmitting link 82 to the right. The spring force urging link 82 to the right as viewed in FIGURE 5 is in turn transmitted to bell crank 66 tending to rotate the bell crank in a counterclockwise direction about pivot 68. This biasing action is transmitted from the bell crank to link 60, thereby biasing link 54 in a counterclockwise direction about the axis of shaft 12.

Thus, as shaft 12 rotates in a counterclockwise direction, pin 52 on crank 50 tries to move away from finger 56, but finger 56 is maintained in contact with pin 52 by virtue of the counterclockwise spring bias applied to the linkage from bell-spring 140.

Upon an increasing draft signal, link 54 thus swings in a counterclockwise direction about pivot 112 to the dotted line position of FIGURE 5, thereby swinging bell crank 66 in a counterclockwise direction about pivot 68, this movement being transmitted by link 82 to draw pivot 84 to the right, thereby swinging link 86 into the dotted line position of FIGURE 5. This movement of link 86 drives pivot 92, and the valve spool, to the right to advance the spool to its raise position. Fluid under pressure is transmitted through the valve to the hydraulic motor to drive the rockshaft in implement elevating movement.

As the rockshaft is rotated to elevate the implement, pivot 112 is moved to the right as viewed in FIGURE 5. Assuming rotation of the rockshaft through an angle which moves pivot 112 to position 112a in FIGURE 5, this movement of pivot 112 is transmitted by follow-up link 24 to shift pivot 110 to the right to the location indicated at 110a. This movement in turn swings link 98 in a counterclockwise direction about pivot 100 to shift pivot 96 to the location indicated at 96a.

The effect of this follow-up action on the valve spool is dependent upon the effect on the magnitude of draft due to the elevating movement of the implement which has resulted in the shifting of pivot 112 to position 112a.

If the elevation of the implement has had no effect on the magnitude of the draft, draft signal link 54 will still be in the broken line position of FIGURE 5, and hence pivot 84 will still be in the original broken line position. In this event, the slight leftward movement of pivot 96 described above will swing link 86 slightly to the left as viewed in FIGURE 5 to locate pivot 88 in the position indicated at 88a. The foregoing movement of pivot 88 draws the valve spool back toward, but not all the way to, its neutral or holding position. This action is desired because if raising of the implement has not reduced the draft, further raising of the implement is required and hence it is necessary to maintain the valve spool in a raising position.

If, on the other hand, the elevation of the implement which resulted in the movement of pivot 112 to position 112a has resulted in a reduction in draft, the draft sensing mechanism has transmitted the signal to link 54 and link 54 has rotated in a clockwise direction about the axis of shaft 12 from the broken line position of FIGURE 5 back toward the original full line position.

With pivot 96 at location 96a of FIGURE 5, pivot 88 will reach its original or valve neutral position when pivot 84 reaches position 84a. This position is transmitted through link 82 and bell crank 66 to link 60 so that, when pivot 62 is located at position 62a, the valve spool is in its neutral or holding position and further raising movement of the implement is stopped.

Referring now to FIGURE 6, the full line portion of this figure indicates the linkage in exactly the same position as the full line configuration of FIGURE 5. Upon the sensing of a decrease in draft from the desired setting, the change in draft signal is applied to the linkage to cause a clockwise rotation of link 50 about the axis of shaft 12 from the full line position to the dotted line position. This movement of link 50 is transmitted by link 60 to rotate bell crank 66 in a clockwise direction about pivot 68, thereby driving link 82 to the left as viewed in FIGURE 6 to swing link 86 in a clockwise direction about pivot 96, thereby shifting pivot 92 and the valve spool to the left to the lowering side of the valve neutral or holding position. This positioning of the valve dumps pressure from motor 18, thereby causing the implement to lower.

Assuming a lowering movement of the implement causing a shifting of pivot 112 to the position 112b pivot 110 is shifted to position 110b, thereby swinging pivot 96 to position 96b.

Assuming the draft signal input to be unaffected by the lowering of the implement, pivot 88 will be shifted by the re-location of pivot 96 to position 96b to move pivot 88 to position 88b. Since this position does not restore pivot 88 to its original valve neutral position, the valve is still in a lowering position and further lowering of the implement will take place.

If, however, movement of pivot 96 to position 96b by lowering of the implement combined with an increase in draft restores pivot 88 to its original position, then pivot 84 will be at location 84b, consequently locating pivots 64, 80 and 62 at locations 64b, 80b and 62b.

From FIGURES 5 and 6, it will be noted that in both cases upon the application of a change in draft signal, correcting movement of the implement is stopped before the draft signal linkage is restored to its original position. Thus, at the conclusion of the correction operation of FIGURE 5, the implement is travelling at a shallower depth, but at a slightly increased draft as compared to its original setting. In FIGURE 6, the implement is travelling at a greater depth and a slightly reduced draft as compared to the initial conditions. By designing the system to operate in this manner, the control mechanism always inherently undercorrects for a variation from the initially established condition. By so doing, hunting or oscillation of the implement is avoided in that an overcorrecting movement of the implement simply does not occur under most normal conditions of operation.

Valve spring 140 functions not only to eliminate backlash or lost motion in the valve, but further applies a constant continual biasing force to the linkage, thereby minimizing backlash and lost motion throughout the linkage itself. By virtue of the constant biasing action applied by spring 140, a positive direct connection between the control linkage and valve sensing mechanism is not required and sudden momentary increases in draft, such as occasioned by a plow striking an imbedded stone, do not result in a sudden direct positive input to the valve because pin 94 can momentarily swing free from finger 56 and then return before the reaction is transmitted to the linkage.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a draft control system for a tractor drawn implement having hydraulic motor means operable to raise or lower the implement to decrease or increase the draft applied to the implement, valve means for controlling said motor means and having a valve member movable in opposite directions from a neutral or holding position to respectively actuate said motor means to raise or lower said implement, and draft sensing means operable to transmit a signal representative of the magnitude of draft applied to the implement; a first link mounted at one end for rotation about a fixed axis and having a first pivot mounted at its opposite end, a second link mounted for swinging movement about said first pivot, means for swinging said second link about said first pivot in response to signals from said draft sensing means, compound link means interposed between the second link and said valve member for transmitting swinging movement of said second link to said valve member to shift said valve member, and means for adjusting said first link about said stationary axis to vary the displacement of said second link for a given movement of said draft sensing means, such adjustment of said first link not substantially moving said valve.

2. In a draft control system as defined in claim 1; the improvement wherein said compound link means comprises a valve control link coupled at a location intermediate its ends to said valve member, means for positioning one end of said valve control link in accordance with the elevation of said implement, and a transmitting link pivotally interconnected at one end to the opposite end of said valve control link and pivotally connected at its other end to said second link, said means for rotating said first link being operable to locate said first pivot in a position in which the pivotal interconnection between said valve control link and said transmitting link remains substantially stationary throughout the full range of swinging movement of said second link in response to signals from said draft sensing means.

3. In a draft control system as defined in claim 1; the improvement wherein said second link is a bell crank pivotally mounted at one end on said first pivot, said means for swinging said second link comprises signal transmitting link means pivotally coupled at one end to an intermediate location on said bell crank for swinging said bell crank about said first pivot in response to signals from said draft sensing means, and said compound link means includes a transmitting link pivotally coupled at one end by a second pivot to the other end of said bell crank.

4. In a draft control system as defined in claim 3; the improvement wherein said compound link means comprises a valve control link pivotally connected at one end by a third pivot to the other end of said transmitting link, said means for rotating said first link being operable to locate said first pivot in a zero sensitivity position wherein swinging movement of said bell crank about said first pivot in response to signals from said draft sensing means swings said second pivot in a substantially circular arc about said third pivot to maintain said third pivot in a substantially fixed position.

5. In a draft control system for a tractor drawn implement having hydraulic motor means operable to raise or lower the implement to decrease or increase the draft applied to the implement, valve means for controlling said motor means and having a valve member movable in opposite directions from a neutral or holding position to respectively actuate said motor means to raise or lower said implement, and draft sensing means operable to transmit a signal representative of the magnitude of draft applied to the implement; the improvement wherein said sensing means includes a shaft rotatable about a fixed axis to angular positions representative of the draft applied to the implement, a crank fixed to said shaft for rotation therewith, a pin projecting from said crank, pivotally constrained compound link means coupled to said valve member for positioning said valve member, a first link in said compound link means mounted for rotation coaxially of said shaft in a plane intercepting said pin and having a finger projecting angularly from one side of said first link, said first link being rotatable relative to said crank between end limits defined by the engagement of said pin with said finger or said one side of said link, and spring means coupled to said valve member resiliently biasing said compound linkage in a direction biasing said finger into engagement with said pin.

6. In a combination draft and position control system for a tractor drawn implement, hydraulic motor means operable to raise or lower the implement, valve means for controlling operation of said motor means and having a valve spool reciprocable in opposite directions from a neutral or holding position respectively to a raise position or a lower position to actuate said motor means to raise or lower said implement, draft sensing means for transmitting a signal representative of the magnitude of draft applied to said implement, follow-up link means for transmitting a signal representative of the position of said implement, a valve control link pivotally coupled at a location intermediate its ends to said valve spool, first linkage means coupling said draft sensing means to a first pivot at one end of said valve control link, second linkage means coupling said follow-up link means to a second pivot at the opposite end of said valve control link, said valve control link positioning said valve spool in a position jointly determined by the positions of said first and said second pivots first manually operable means coupled to said first linkage for positioning said first linkage in a configuration such that said first pivot remains substantially stationary regardless of the signal transmitted by said draft sensing means, and second manually operable means coupled to said second linkage for shifting the location of said second pivot to manually control raising and lowering of said implement.

7. In a system as defined in claim 6; the improvement wherein said second linkage means comprises a first link pivotally connected at one end to said follow-up link means and pivotally connected at its opposite end to said second pivot, a third pivot on said first link intermediate the ends of said first link and supporting said first link upon said second manually operable means, said second manually operable means having a positioning link mounted at one end for manually controlled pivoting movement about a fixed pivot and coupled at its opposite end to said third pivot.

8. In a system as defined in claim 6, the improvement wherein said first linkage means comprises a first transmitting link movable in response to signals from said draft sensing means, a second transmitting link connected at one end to said first pivot and a bell crank pivotally connected at a first point to one end of said first transmitting link and pivotally connected at a second point to the other end of said second transmitting link, said first manually operable means comprising a sensitivity adjustment link mounted at one end for pivoting movement about a fixed pivot, a third pivot pivotally connecting the opposite end of said sensitivity adjustment link to a third point on said bell crank to support said bell crank for swinging movement about said third pivot in direct response to draft signal induced movement of said first transmitting link, and manual means for pivoting said sensitivity adjustment link about said fixed pivot between a first end limit at which swinging movement of said bell crank is transmitted by said second transmitting link to said first pivot and a second end limit at which said first pivot remains substantially stationary during swinging movement of said bell crank about said third pivot.

References Cited

UNITED STATES PATENTS

| | | | |
|---|---|---|---|
| 2,715,863 | 8/1955 | Bunting | 172—9 |
| 2,851,938 | 9/1958 | Giertz et al. | 172—10 X |
| 3,198,261 | 8/1965 | Clarke | 172—9 |
| 3,241,621 | 3/1966 | Bunting | 172—9 |
| 3,194,319 | 7/1965 | Faure | 172—9 |

ABRAHAM G. STONE, *Primary Examiner.*

J. R. OAKS, *Assistant Examiner.*